US010868315B2

(12) United States Patent
 Kim et al.

(10) Patent No.: US 10,868,315 B2
(45) Date of Patent: Dec. 15, 2020

(54) SYSTEM FOR MEASURING HIGH PRESSURE OF IN-TANK REGULATOR

(71) Applicants: HYUNDAI MOTOR COMPANY, Seoul (KR); KIA MOTORS CORPORATION, Seoul (KR)

(72) Inventors: Chang Ho Kim, Yongin-si (KR); Jang Ho Choi, Seoul (KR); Hyung Ki Kim, Seoul (KR); Ji Hyun Shim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 223 days.

(21) Appl. No.: 15/710,525

(22) Filed: Sep. 20, 2017

(65) Prior Publication Data
 US 2018/0175410 A1 Jun. 21, 2018

(30) Foreign Application Priority Data
 Dec. 15, 2016 (KR) .................. 10-2016-0171373

(51) Int. Cl.
 *G01L 19/00* (2006.01)
 *F16K 15/18* (2006.01)
 (Continued)

(52) U.S. Cl.
 CPC ....... *H01M 8/04104* (2013.01); *F17C 13/025* (2013.01); *F17C 2205/0329* (2013.01); *F17C 2205/0335* (2013.01); *F17C 2205/0338* (2013.01); *F17C 2205/0341* (2013.01); *F17C 2205/0382* (2013.01); *F17C 2205/0394* (2013.01); *F17C 2221/012* (2013.01); *F17C 2223/0123* (2013.01);
 (Continued)

(58) Field of Classification Search
 CPC ..... G01L 19/0007; F16K 15/18; F16K 17/168
 USPC ............................................ 137/557; 73/756
 See application file for complete search history.

(56) References Cited

U.S. PATENT DOCUMENTS 6,629,544 B2 10/2003 Nakajima et al.
2010/0001851 A1 1/2010 Handa
 (Continued)

FOREIGN PATENT DOCUMENTS

JP 2011-179528 A 9/2011
JP 5804751 B2 11/2015
 (Continued)

OTHER PUBLICATIONS

Original and Translation of Suzuki et al.; JP 2011179528 A; Sep. 15, 2011.*
Gustin, Ronald R; WO 9854557 A1; Dec. 3, 1998.*

*Primary Examiner* — Paul J Gray
(74) *Attorney, Agent, or Firm* — Morgan, Lewis & Bockius LLP (57) ABSTRACT

A system for measuring pressure of an in-tank regulator includes a direct-pipe flow path which directly communicates with an inside of a high-pressure container, a high-pressure sensor, of which a portion is movable into the direct-pipe flow path, fastened to and separated from the direct-pipe flow path, and a shut-off valve disposed on the direct-pipe flow path between the high-pressure container and the high-pressure sensor, wherein when the high-pressure sensor is separated from the direct-pipe flow path, the direct-pie flow path is sealed by the shut-off valve.

8 Claims, 4 Drawing Sheets

(51) Int. Cl.
  *F16K 17/168*    (2006.01)
  *H01M 8/04089*   (2016.01)
  *F17C 13/02*     (2006.01)
  *G01L 19/14*     (2006.01)
  *H01M 8/04082*   (2016.01)

(52) U.S. Cl.
  CPC    *F17C 2250/043* (2013.01); *F17C 2250/0491* (2013.01); *F17C 2260/015* (2013.01); *F17C 2270/0168* (2013.01); *F17C 2270/0178* (2013.01); *F17C 2270/0184* (2013.01); *G01L 19/14* (2013.01); *H01M 8/04201* (2013.01); *H01M 2250/20* (2013.01); *Y02E 60/321* (2013.01); *Y02T 90/32* (2013.01)

(56)            References Cited

U.S. PATENT DOCUMENTS

| 2011/0143243 | A1 | 6/2011 | Arthur et al. |
| 2015/0176719 | A1 | 6/2015 | Shim et al. |

FOREIGN PATENT DOCUMENTS

| KR | 10-1113641 B1 | 2/2012 |
| KR | 10-1120340 B1 | 2/2012 |
| KR | 10-2016-0087087 A | 7/2016 |
| WO | 98/54557 A1 | 12/1998 |

* cited by examiner

SYSTEM FOR MEASURING HIGH PRESSURE OF IN-TANK REGULATOR

CROSS-REFERENCE TO RELATED APPLICATION

This application claims under 35 U.S.C. § 119(a) the benefit of priority to Korean Patent Application No. 10-2016-0171373 filed on Dec. 15, 2016, the entire contents of which are incorporated herein by reference.

BACKGROUND

(a) Technical Field

The present disclosure relates to a system which can measure pressure of a high-pressure tank included in a fuel or hydrogen supply system of a vehicle equipped with a fuel cell system. Particularly, the present disclosure relates to a system for measuring pressure of an in-tank regulator, wherein the system includes a high-pressure sensor, which can be detached from/attached to a direct-pipe flow path connected with the in-tank regulator and a high-pressure tank, and a shut-off valve, thereby synchronizing whether the direct-pipe flow path is opened/closed by the shut-off valve with attaching/detaching the high-pressure sensor.

(b) Description of Related Art

In general, a fuel cell system includes a fuel cell stack generating electric energy, a fuel supply system supplying fuel (e.g., hydrogen) to the fuel cell stack, an air supply system supplying air (e.g., oxygen), which is an oxidant required for an electrochemical reaction in the fuel cell stack, a heat and water management system controlling an operation temperature of the fuel cell stack, and the like.

High-pressure compression hydrogen with a pressure of approximately 700 bars is stored in a hydrogen tank provided in the fuel supply system, that is, a hydrogen supply system, and the compression hydrogen stored in the hydrogen tank is discharged to a high-pressure line according to on/off of a high-pressure controller mounted on an inlet of the hydrogen tank and thereafter, depressurized through a start valve and a hydrogen supply valve to be supplied to the fuel cell stack.

In the related art, hydrogen of a high-pressure hydrogen tank with a pressure of approximately 700 bars is primarily depressurized to 20 bars or less in a high-pressure regulator. The hydrogen is further depressurized to 4 bars or less through the hydrogen supply valve or an ejector and supplied to the fuel cell stack. When secondary depressurization is performed by using the hydrogen supply valve in the fuel cell system, hydrogen airtightness is secured through a start valve and a hydrogen flow is precisely controlled through the hydrogen supply valve. Further, a hydrogen supply system includes an in-tank regulator which integrates a high-pressure solenoid valve and a depressurization regulator, and therefore stability is very high since the in-tank regulator supplies the hydrogen with a depressurized pressure in the high-pressure hydrogen tank.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to solve the above-described problems associated with prior art.

A pressure measuring system by the in-tank regulator needs to requisitely include a flow path which is directly extended from the high-pressure container in order to measure the pressure of the high-pressure container, and as a result, it is difficult to cope with an abnormal situation. In particular, when leak occurs in the flow path directly extended from the high-pressure container or the leak occurs in the high-pressure sensor attached to the flow path or a failure occurs in the high-pressure sensor, there are inconvenience and a disadvantage that hydrogen in a high-pressure tank needs to be exhausted in order to remove the high-pressure sensor.

In one aspect, the present disclosure provides a system for a high pressure of an in-tank regulator, including: a direct-pipe flow path which directly communicates with an inside of a high-pressure container; a high-pressure sensor, of which a portion is movable into the direct-pipe flow path, fastened to and separated from the direct-pipe flow path; and a shut-off valve disposed on the direct-pipe flow path between the high-pressure container and the high-pressure sensor, wherein when the high-pressure sensor is separated from the direct-pipe flow path, the direct-pie flow path is sealed by the shut-off valve.

In a preferred embodiment, the shut-off valve may further include a taper portion formed on one end of the high-pressure sensor.

In another preferred embodiment, the width of the taper portion may decrease toward the high-pressure sensor.

Further in another preferred embodiment, the high-pressure sensor may further include a fastening portion fastening the high-pressure sensor and the regulator to each other, and a sensor configured to measure the pressure of the direct-pipe flow path, and the fastening portion may fasten the regulator and the high-pressure sensor by screw fastening.

In yet another preferred embodiment, the direct-pipe flow path may have a protrusion formed at one point thereof, and the protrusion may be formed between the shut-off valve and the high-pressure sensor.

In still yet another preferred embodiment, when the high-pressure sensor is moved into the direct-pipe flow path, the sensor may push the taper portion toward the inside of the direct-pipe flow path.

In a further preferred embodiment, when the high-pressure sensor separated from the regulator, the taper portion may push the protrusion toward the outside of the direct-pipe flow path by high pressure in the direct-pipe flow path.

In another further preferred embodiment, the sensor is movable into a pupil formed by the protrusion to push the taper portion toward the inside of the direct-pipe flow path.

In still another preferred embodiment, when external force is not applied to the shut-off valve, the shut-off valve may maintain a normally closed (NC) state.

The present disclosure provides the following effects through the means for solving problems.

According to the present disclosure, when a shut-off valve shuts off a direct pipe while a high-pressure is attached/detached, gas in a high-pressure container need not be exhausted to the outside in order to detach/attach the high-pressure sensor. That is, a repairing process for replacing the high-pressure sensor is simplified to shorten a required time.

In the related art, while the gas is exhausted from the high-pressure container, external leak or a problem in a component can continuously occur, but in the present disclosure, since the high-pressure sensor is attached/detached and the shut-off valve closes a high-pressure line, a time required for coping with abnormal and problematic situations can be remarkably shortened.

In the case of a gasoline vehicle, as compared with a case in which all gasoline is extracted to the outside in order to replace the component and thereafter the gasoline is reusable, in the present disclosure using the gas as a fuel, when the fuel is exhausted to the outside, the gas cannot but be discharged to the atmosphere, and as a result, it is possible to prevent the fuel from being unnecessarily consumed in that the fuel need not be exhausted.

After the high-pressure sensor is refastened, the leak needs to be verified by increasing the pressure of the high-pressure container to a high pressure at a level of approximately 700 bars again in the related art, but in the present disclosure, since a state in which the pressure of the high-pressure container is not exhausted is maintained, it may be easily verified whether the leak occurs within a short time.

Since the hydrogen is depressurized by the in-tank regulator positioned in the high-pressure container to be transferred to the hydrogen supply system of the fuel cell system, durability or airtightness of the hydrogen supply system can increase and since the high-pressure line is not formed except for a charging pipe, safety and stability of the hydrogen supply system can increase.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Reference numerals set forth in the Drawings includes reference to the following elements as further discussed below.

100: in-tank regulator
110: direct-pipe flow path
120: protrusion of direct-pipe flow path
200: high-pressure sensor
210: fastening portion of high-pressure sensor
220: sensor of high-pressure sensor
300: shut-off valve
310: taper portion of shut-off valve It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that present description is not is intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Terms including "part", "unit" "module", and the like disclosed in the specification mean a unit that processes at least one function or operation and this may be implemented by hardware or software or a combination of hardware and software.

A fuel cell system mounted on a vehicle may be generally configured to include a fuel cell stack generating electric energy, a fuel supply device supplying fuel (hydrogen) to the fuel cells stack, an air supply device supplying oxygen in air, which is an oxidant required for an electrochemical reaction to the fuel cell stack, and a cooling system removing reaction heat of the fuel cell stack to the outside of the system and controlling an operation temperature of the fuel cell stack.

Figure 1:
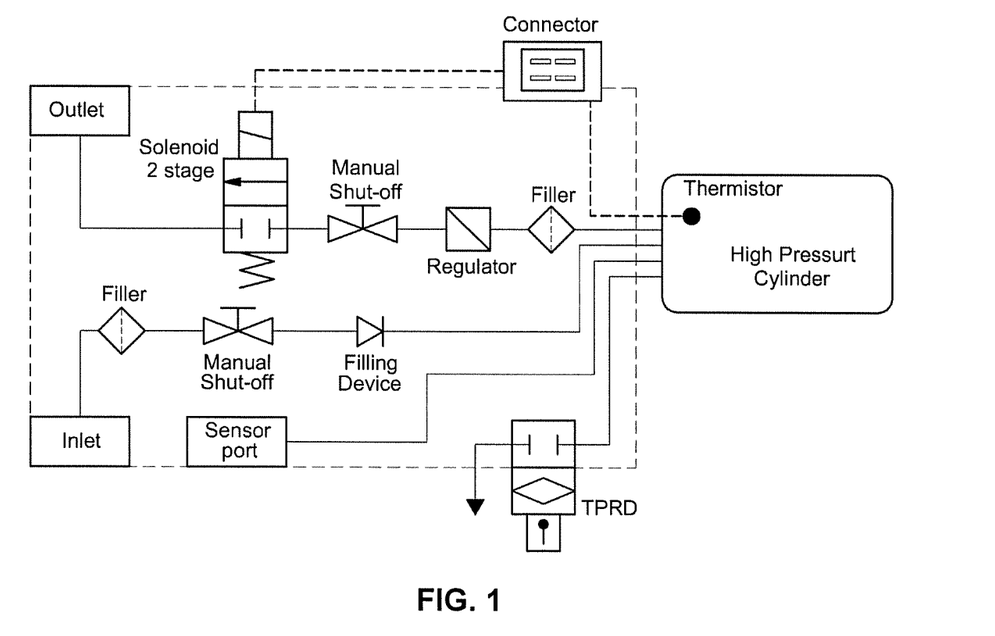
FIG. 1 is a diagram illustrating a configuration of a hydrogen supply system of a fuel cell system on which an in-tank regulator is mounted in the related art.

FIG. 1 is a diagram illustrating a general configuration of a hydrogen supply system that transfers fuel from a high-pressure container to a stack in a fuel cell system and according to FIG. 1, the high-pressure container storing fuel, a depressurization regulator, a solenoid valve, and the like are illustrated.

In the fuel cell system, a method that stores the hydrogen in the high-pressure container may adopt a high-pressure compression (350 bars and 700 bars compression) scheme. When an external regulator which may be separately provided outside the high-pressure container is used, a high-pressure line should be formed in each solenoid valve. While the vehicle on which the fuel cell system is mounted is driven, that is, while the hydrogen is supplied, a pressure of 350 bars or 700 bars may be continuously applied to the high-pressure line. At parts or points to which the high pressure is continuously applied, durability of a fitting, a valve, and a tube is problematic to influence stability of the entire hydrogen supply system. By considering the problem, when the in-tank regulator is applied instead of the external regulator, the high-pressure line may be eliminated. Furthermore, as the high-pressure line is eliminated, safety may be provided at the time of operating the system, the entire fuel cell system is simplified, and cost is saved.

However, when the hydrogen supply system is configured to include the in-tank regulator, a separate direct-pipe flow path directly connected with the high-pressure container needs to be requisitely included in order to measure the pressure of the high-pressure container and a high-pressure sensor for measuring the pressure may be provided on the direct-pipe flow path. In the related art, when the high-pressure sensor is separated from the direct-pipe flow path, a problem that the direct-pipe flow path to which the high pressure is applied is exposed to the outside occurs, and as a result, the high-pressure sensor needs to be separated after exhausting all gas in the high-pressure container. The present disclosure is contrived to solve the problem and includes the shut-off valve which may be provided on the direct-pipe flow path in the in-tank regulator. Further, when the high-pressure sensor is separated from the regulator, in detail, the direct-pipe flow path in the regulator, the shut-off valve closes the direct-pipe flow path to prevent the high pressure in the direct-pipe flow path from being exposed to the outside. In addition, according to another embodiment of the present disclosure, the direct-pipe flow path, the shut-off valve, and the high-pressure sensor may be formed at an opposite side of a valve sealed by an end plug rather than at the valve side including a nozzle unit through which the hydrogen is charged/discharged in the high-pressure container. Even in this case, the pressure which is the same as the pressure in the high-pressure container is formed on the direct-pipe flow path formed at the end plug side, and it may be determined whether the shut-off valve is opened or closed by detaching/attaching the high-pressure sensor similarly to the case where the direct-pipe flow path is formed in the in-tank regulator.

Hereinafter, a configuration and an operating principle of the system for measuring pressure of an in-tank regulator according to the present disclosure will be described in detail with reference to drawings. Furthermore, the present disclosure described below relates to the high-pressure container using the in-tank regulator, and as a result, an in-tank regulator and a regulator are used together, but both sides may mean the same component.

Figure 2:
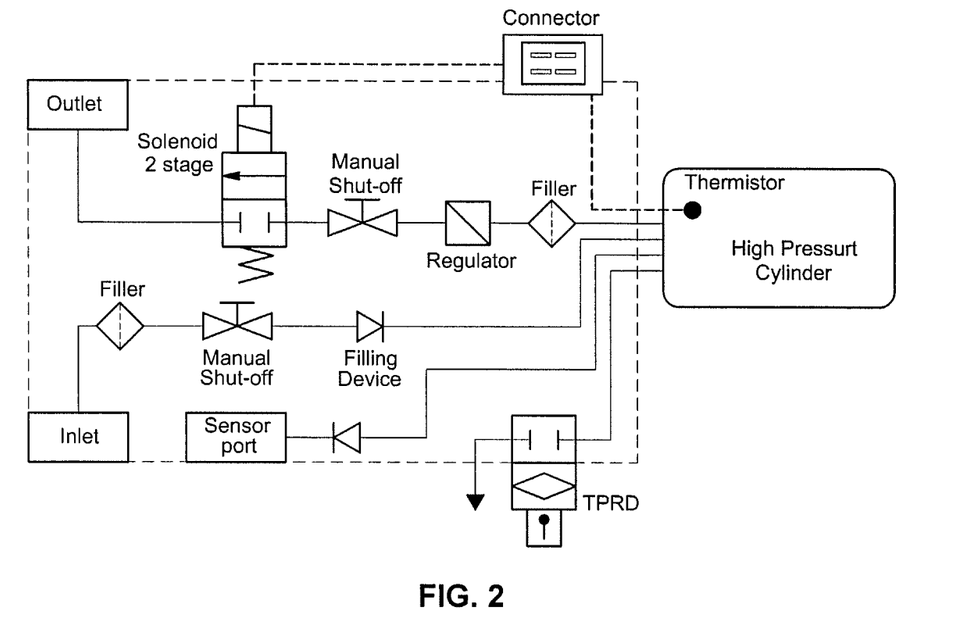
FIG. 2 is a diagram illustrating a configuration of a hydrogen supply system of a fuel cell system on which an in-tank regulator is mounted according to an embodiment of the present disclosure.

FIG. 2 is a diagram according to an embodiment of the present disclosure, illustrating a configuration of a hydrogen supply system of a fuel cell system. In FIG. 2, it is illustrated that a shut-off valve 300 may be provided between a high-pressure sensor 200 and the high-pressure container. Further, since components such as the high-pressure container, the solenoid valve, a filter, and a manual valve illustrated in FIG. 2 as components which may be generally adopted and used in a hydrogen supply system of a general fuel cell system in the related art may be selected in a conventional technical scope, a description thereof will be omitted below.

Figure 3:
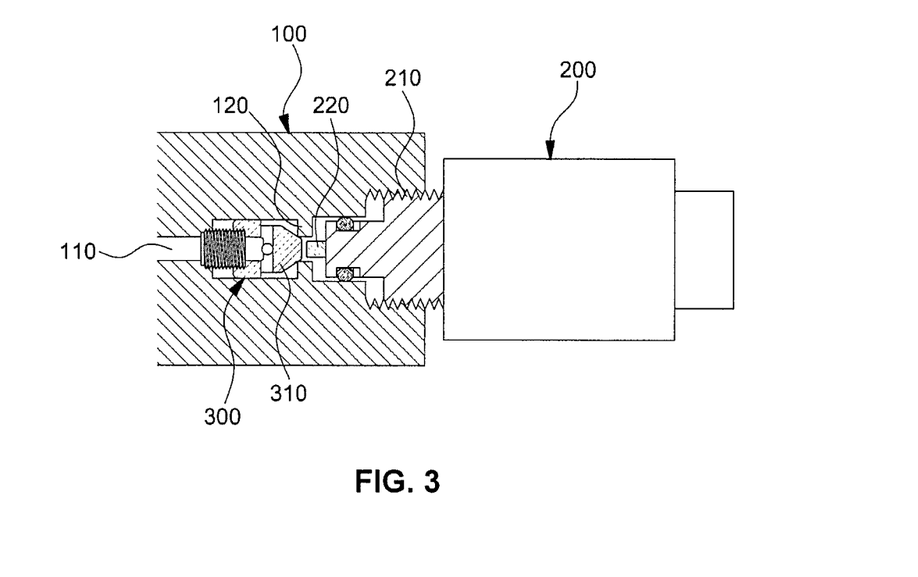
FIG. 3 is a diagram illustrating a cross-section of a system for measuring pressure of an in-tank regulator according to another embodiment of the present disclosure.

FIG. 3 is a diagram illustrating the structure of a system for measuring pressure of an in-tank regulator 100 according to an embodiment of the present disclosure. In the system for measuring pressure of an in-tank regulator 100 according to the present disclosure, the in-tank regulator 100 may be presented. The in-tank regulator 100 is directly connected to or in communication with the inside of the high-pressure container, and as a result, the in-tank regulator 100 may share a high-pressure in the high-pressure container.

The in-tank regulator 100 may have a direct-pipe flow path 110 therein. The in-tank regulator 100 may be directly connected to or in communication with the inside of the high-pressure container through the direct-pipe flow path 110. In other words, the direct-pipe flow path 110 of the present disclosure may be regarded as a flow path extended from the inside of the high-pressure container. Accordingly, the pressure of the direct-pipe flow path 110 may be continuously maintained to be the same as the pressure of the inside of the high-pressure container. Therefore, the pressure measured in the direct-pipe flow path 110 may be determined as the pressure of the inside of the high-pressure container.

The direct-pipe flow path 110 is not limited to a cross-sectional shape thereof and may preferably have a cylindrical shape. Further, the width of the direct-pipe flow path 110 is permissible if gas or a fluid may flow through the corresponding direct-pipe flow path 110 and the width of the direct-pipe flow path 110 may be formed differently depending on a specific point or a specific position.

A protrusion 120 of the direct-pipe flow path 110 may be formed at one point of the direct-pipe flow path 110. The protrusion 120 may be formed at a point where the shut-off valve 300 and the high-pressure sensor 200 meet in the direct-pipe flow path 110. The shape of the protrusion 120 is not limited, however, a shape in which the protrusion 120 contacts one end of the shut-off valve 300 to close the direct-pipe flow path 110 is permissible and preferably, the protrusion 120 may be formed to protrude from an internal cross-section of the direct-pipe flow path 110 with a predetermined size.

In a preferred embodiment of the present disclosure, a diameter of the direct-pipe flow path 110 may increase at an end of the in-tank regulator 100. The high-pressure sensor 200 may be inserted, connected, or fastened into the direct flow path 110 of which the diameter increases. In the present disclosure, a method in which the high-pressure sensor 200 is inserted, connected, or fastened into the direct-pipe flow path 110 is not limited, however, a method that may maintain airtightness between the high-pressure sensor 200 and the direct-pipe flow path 110 may be used. Preferably, a screw groove may be dug at a point where the high-pressure sensor 200 is inserted into the direct-pipe flow path 110 and a separate screw valley corresponding to a screw groove of the high-pressure sensor 200 may be formed at a point of the direct-pipe flow path 110, into which the high-pressure sensor 200 is inserted. Therefore, the high-pressure sensor 200 and the direct-pipe flow path 110, that is, the regulator 100 may be fastened with each other by a screw fastening scheme. Furthermore, a sealing member for further maintaining the airtightness between the high-pressure sensor 200 and the direct-pipe flow path 110 may be provided at a point where the high-pressure sensor 200 and the direct-pipe flow path 110 contact each other. Preferably, an O-ring may be used. That is, referring to FIG. 3, the direct-pipe flow path 110 passing through the protrusion 120 may be provided in a structure in which the diameter of the direct-pipe flow path 110 increases stepwise.

Meanwhile, as the shut-off valve 300 used in the present disclosure, a normally closed (NC) valve may be used. The shut-off valve 300 may include a component for fastening with the regulator 100, in detail, the direct-pipe flow path 110 in the regulator. The fastening method of the shut-off valve 300 and the in-tank regulator 100, in detail, the direct-pipe flow path 110 in the regulator is not limited, and preferably, the shut-off valve 300 and the direct-pipe flow path 110 may be fastened by the screw fastening scheme. Further, a sealing member may be included at the point where the shut-off valve 300 and the direct-pipe flow path 110 are screw-fastened, which may seal the shut-off valve 300 and the direct-pipe flow path 110 and prevent vibration. Preferably, the O-ring may be provided between the shut-off valve 300 and the direct-pipe flow path 110.

The shut-off valve 300 may include a taper portion 310 disposed in the protrusion 120 of the direct-pipe flow path 110. A smallest width of the taper portion 310 may be smaller than that of a pupil formed by the protrusion 120, and a largest width of the taper portion may be larger than that of the pupil formed by the protrusion 120 and smaller than that of the direct-pipe flow path 110. Therefore, the taper in portion 310 may principally freely move on the direct-pipe flow path 110. However, when the taper portion 310 is inserted into the protrusion 120, the taper portion 310 may be inserted by penetrating the protrusion 120 up to one point of the taper portion 310 where the width of the protrusion 120 and the width of the taper portion 310 are the same as each other. That is, in the present disclosure, one pointed portion of the taper portion 310 may be configured to be inserted into the pupil formed by the protrusion 120.

When the taper portion 310 of the shut-off valve 300 is maximally inserted into the protrusion 120 of the direct-pipe flow path 110, that is, when a gap is filled between the taper portion 310 and the protrusion 120 by contacting an inclined surface of the taper portion 310 and the protrusion 120, the direct-pipe flow path 110 extended from the high-pressure container may be closed.

Meanwhile, the high-pressure sensor 200 which may be used in the present disclosure may include a sensor 220 and a fastening portion 210. The sensor 220 of the high-pressure sensor 200 may be formed on one end of the high-pressure sensor 200 and the width of the sensor 220 may be formed to be smaller than the pupil formed by the protrusion 120 of the direct-pipe flow path 110. Therefore, when the high-pressure sensor 200 is mounted on or inserted into the regulator 100, in detail, the direct-pipe flow path 110 in the regulator, the sensor 220 may be inserted into the pupil formed by the protrusion 120 of the direct-pipe flow path 110. Further, according to the embodiment of the present disclosure, the high-pressure sensor 200 may be provided to have multiple cylindrical cylinders having diameters with different lengths. More preferably, the high-pressure sensor 200 may be provided to include the cylindrical sensor 220 having the smallest width, a cylindrical insertion portion having a larger width than the sensor 220 through the sensor 220, the cylindrical fastening portion 210 having the larger width than the insertion portion and having a screw groove for screw fastening, which is dug through the insertion portion, and a cylindrical operation unit exposed to the outside and having the largest width. Furthermore, the sealing member may be provided, which is used for sealing the high-pressure sensor 200 and the regulator 100, in detail, the direct-pipe flow path 110 of the regulator and preventing vibration. Preferably, the O-ring may be inserted between the insertion portion of the high-pressure sensor 200 and the direct-pipe flow path 110 in the regulator.

Figure 4:
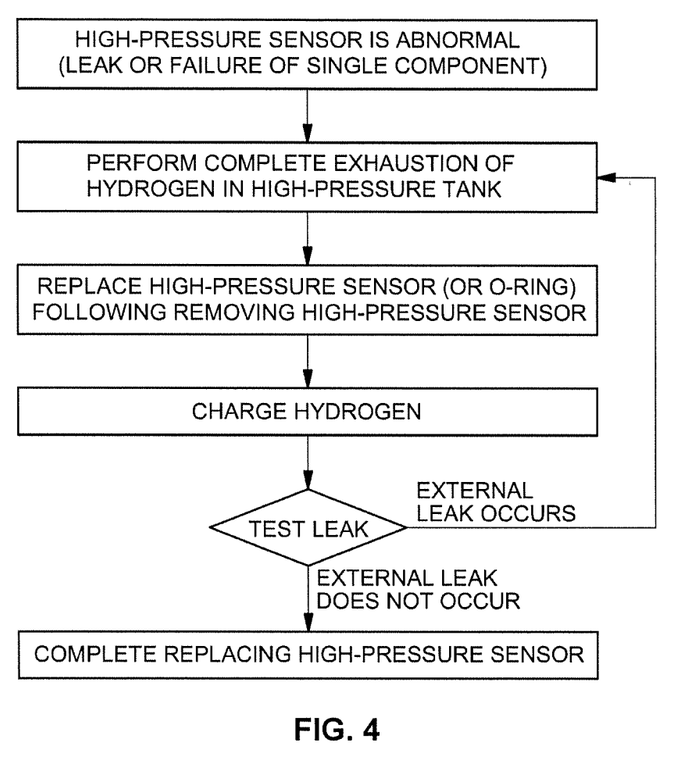
FIG. 4 is a flowchart illustrating a flow for separating and remounting a high-pressure sensor in a fuel cell system on which an in-tank regulator is mounted in the related art.

Hereinafter, a driving order and a driving principle of the system for measuring pressure of an in-tank regulator 100 will be described with reference to FIGS. 3 to 5. FIG. 4 is a diagram illustrating a coping logic with a leak of the direct-pipe flow path 110, an error of the high-pressure sensor 200, and/or a case where the sealing member is damaged in the high-pressure container on which the in-tank regulator 100 is mounted in the related art. According to FIG. 4, in the direct-pipe flow path 110 on which the in-tank regulator 100 in the related art and the high-pressure sensor 200 are mounted, when the high-pressure sensor 200 is removed or separated from the in-tank regulator 100, the high pressure in the direct-pipe flow path 110 may be just exposed to the outside. In this case, dangerous situations including hydrogen explosion, and the like may be caused, and as a result, complete exhaustion of the high pressure in the high-pressure container and the direct-pipe flow path 110 to the outside needs to be particularly precedently performed before removing or separating the high-pressure sensor 200.

However, referring back to FIG. 3, in FIG. 3, the high-pressure sensor 200 may be fastened with the in-tank regulator 100, in detail, the direct-pipe flow path 110 in the regulator. In this case, the sensor 220 of the high-pressure sensor 200 may contact the taper portion 310 of the shut-off valve 300 through the pupil formed by the protrusion 120 of the direct-pipe flow path 110. Further, the sensor 220 of the high-pressure sensor 200 may press a tip of the taper portion 310 of the shut-off valve 300 in the direct-pipe flow path 110 toward the high-pressure container. The shut-off valve 300 may be switched to an opened state as the taper portion 310 is pressed.

Accordingly, the sensor 220 of the high-pressure sensor 200 directly accesses and is directly connected with the direct-pipe flow path 110 and the sensor 220 of the high-pressure sensor 200 may be just exposed to the internal pressure of the direct-pipe flow path 110 and the internal pressure of the high-pressure container. Therefore, while the high-pressure sensor 200 is fastened to the in-tank regulator 100, in detail, the direct-pipe flow path 110 of the regulator, the sensor 220 of the high-pressure sensor 200 may accurately detect the internal pressure of the high-pressure container.

That is, while the high-pressure sensor 200 is completely closely attached, coupled, or fastened to the direct-pipe flow path 110 through screw fastening, the sensor 220 of the high-pressure sensor 200 may be inserted into the pupil formed by the protrusion 120 of the direct-pipe flow path 110 and the sensor 220 of the high-pressure sensor 200 pushes the taper portion 310 of the shut-off valve 300 toward the high-pressure container on the direct-pipe flow path 110, and as a result, the sensor 220 of the high-pressure sensor 200 may be exposed to a pressure which is the same as the internal pressure of the high-pressure container.

Figure 5:
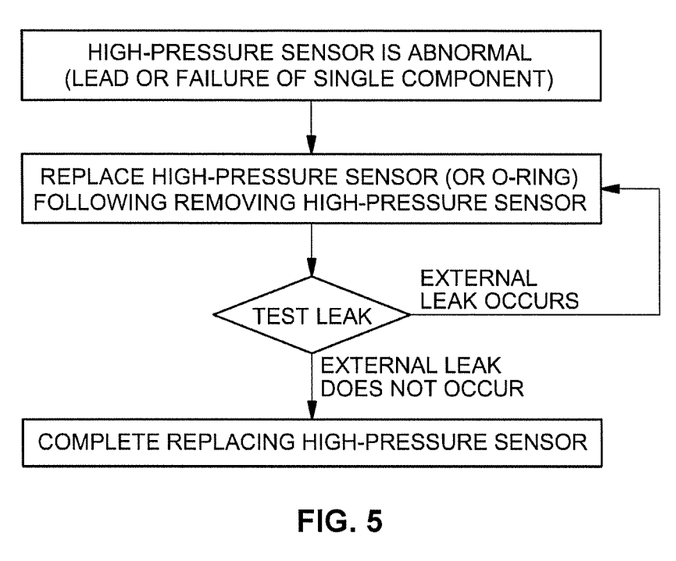
FIG. 5 is a flowchart illustrating a flow for separating and remounting a high-pressure sensor in a system for measuring pressure of an in-tank regulator according to the present disclosure.

FIG. 5 is a diagram according to an embodiment in which the high-pressure sensor 200 is separated from the in-tank regulator 100 in the present disclosure and illustrates a flow for illustrating a series of the processes of separating and removing, and thereafter, remounting and refastening the high-pressure sensor 200 in the system for measuring pressure of an in-tank regulator. According to FIG. 5, when the leak of the direct-pipe flow path 110 occurs, the error of the high-pressure sensor 200 occurs, and/or the sealing member is damaged, the high-pressure sensor 200 may be separated from the in-tank regulator 100, in detail, the direct-pipe flow path 110 in the regulator in order to replace and repair a member in which the abnormal situations occur.

When the high-pressure sensor 200 is separated from the direct-pipe flow path 110 of the regulator, the shut-off valve 300 may be naturally restored to the normally closed (NC) state and may close the direct-pipe flow path 110. Further, the airtightness may be further maintained between the shut-off valve 300 and the protrusion 120 of the direct-pipe flow path 110 even by force with which the high pressure of the high-pressure container formed in the direct-pipe flow path 110 pushes the shut-off valve 300 toward the protrusion 120 of the direct-pipe flow path 110 as well as closing the shut-off valve 300. After the high-pressure sensor 200 is separated from the in-tank regulator 100, the sealing member may be replaced, which is provided between the high-pressure sensor 200 or the high-pressure sensor 200 and the in-tank regulator 100.

When the high-pressure sensor 200 is mounted and fastened onto the direct-pipe flow path 110 in the regulator again, the hydrogen needs to be reinjected so that a predetermined pressure or higher is formed in the high-pressure container in the related art, but since the hydrogen in the high-pressure container maintains the high-pressure state through all processes of carrying out the present disclosure in the present disclosure, an additional time and an additional hydrogen amount required for recharging the hydrogen may be saved.

According to the present disclosure described above in detail, since the shut-off valve 300 shuts off the direct-pipe flow path 110 by the high pressure while detaching/attaching the high-pressure sensor 200, there is an effect in which the gas in the high-pressure container need not be exhausted to the outside in order to attach/detach the high-pressure sensor 200. That is, a repairing process for replacing the high-pressure sensor 200 is simplified to shorten a required time.

In the related art, while the gas is exhausted from the high-pressure container, external leak or a problem in a component continuously occurs, but in the present disclosure, since the high-pressure sensor 200 is attached/detached and the shut-off valve 300 closes the high-pressure line, a time required for coping with abnormal and problem situations may be remarkably shortened.

In the case of a gasoline vehicle, as compared with a case in which all gasoline is extracted to the outside in order to replace the component and thereafter, the gasoline is reusable, in the present disclosure using the gas as a fuel, when the fuel is exhausted to the outside, the gas cannot but be discharged to the atmosphere, and as a result, it is possible to prevent the fuel from being unnecessarily consumed in that the fuel need not to be exhausted.

After the high-pressure sensor 200 is refastened, the leak needs to be verified by increasing the pressure of the high-pressure container to a high pressure at a level of approximately 700 bar again in the related art, but in the present disclosure, since a state in which the pressure of the high-pressure container is not exhausted is maintained, it may be easily verified whether the leak occurs within a short time.

Since the hydrogen is depressurized by the in-tank regulator 100 positioned in the high-pressure container to be transferred to the hydrogen supply system of the fuel cell system, durability or airtightness of the hydrogen supply system may increase and since the high-pressure line is not formed except for a charging pipe, safety and stability of the hydrogen supply system may increase.

In a core spirit of the present disclosure, considering that mounting the high-pressure sensor on the direct-pipe flow path which is in direct communication with the high-pressure container is required by adopting the in-tank regulator, the shut-off valve is installed at one point of the direct-pipe flow path between the high-pressure container and the high-pressure sensor and whether the high-pressure sensor is attached or detached and whether the shut-off valve is opened or closed synchronize with each other and in detail, when the high-pressure sensor is fastened, the shut-off valve is pressed to be opened and when the high-pressure sensor is separated, the shut-off valve is maintained in a closed state to prevent the high pressure in the direct-pipe flow path from being exposed to the outside.

Embodiments of the present disclosure have been explained and described, but it will be appreciated by those skilled in the art that the present disclosure may be modified and changed in various ways without departing from the spirit of the present disclosure described in the claims by the addition, change, deletion or addition of constituent elements, and that the modifications and changes are included in the claims of the present disclosure.

In describing the embodiment of the present disclosure, detailed description of known function or constitutions will be omitted if they make the gist of the present disclosure unclear. In addition, the used terms as terms which are specially defined in consideration of functions in the embodiment of the present disclosure may vary depending on the intention or usual practice of a user or an operator. Accordingly, the terms need to be defined base on contents throughout this specification. Accordingly, the detailed description of the invention does not intend to limit the present disclosure as the disclosed embodiment and it should be interpreted that the appended claims also include other embodiments.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A system for measuring pressure of a high pressure tank, the system comprising:
    a direct-pipe flow path which directly communicates with an inside of a high-pressure container;
    a high-pressure sensor assembly, of which a portion is movable into the direct-pipe flow path, configured to be fastened to and separable from the direct-pipe flow path; and
    a shut-off valve disposed in the direct-pipe flow path between the high-pressure container and the high-pressure sensor assembly,
    wherein the shut-off valve includes a taper portion facing one end of the high-pressure sensor assembly,
    wherein the direct-pipe flow path includes a protrusion on one point of the direct pipe flow path, and the protrusion is arranged between the shut-off valve and the high-pressure sensor assembly,
    wherein the taper portion and the high-pressure sensor assembly are configured such that a part of the taper portion moves into a pupil defined by the protrusion and the part of the taper portion is pushed by the high-pressure sensor assembly toward an inside of the direct-pipe flow path,
    wherein, when the high-pressure sensor assembly is separated from the direct-pipe flow path, the direct-pipe flow path is sealed by the shut-off valve, and
    wherein the high-pressure sensor assembly includes a sensing portion configured to measure the pressure of the direct-pipe flow path, and the sensing portion directly contacts the taper portion when the taper portion is pushed by the high-pressure sensor assembly.

2. The system of claim 1, wherein the high-pressure container includes an in-tank regulator, and
    the direct-pipe flow path is formed in the in-tank regulator.

3. The system of claim 1, wherein the width of the taper portion decreases toward the high-pressure sensor assembly.

4. The system of claim 1, wherein the high-pressure sensor assembly further includes a fastening portion fastening the high-pressure sensor assembly and an in-tank regulator to each other, and, wherein the fastening portion fastens the in-tank regulator and the high-pressure sensor assembly by screw fastening.

5. The system of claim 1, wherein when a fastening portion of the high-pressure sensor assembly is moved into the direct-pipe flow path, the sensing portion pushes the taper portion toward the inside of the direct-pipe flow path.

6. The system of claim 1, wherein when the high-pressure sensor assembly is separated from an in-tank regulator, the taper portion pushes the protrusion toward an outside of the direct-pipe flow path by high pressure in the direct-pipe flow path.

7. The system of claim 1, wherein the sensing portion is movable into the pupil defined by the protrusion to push the taper portion toward the inside of the direct-pipe flow path.

8. The system of claim 1, wherein when external force is not applied to the shut-off valve, the shut-off valve maintains a normally closed (NC) state.

* * * * *